Patented Feb. 2, 1943

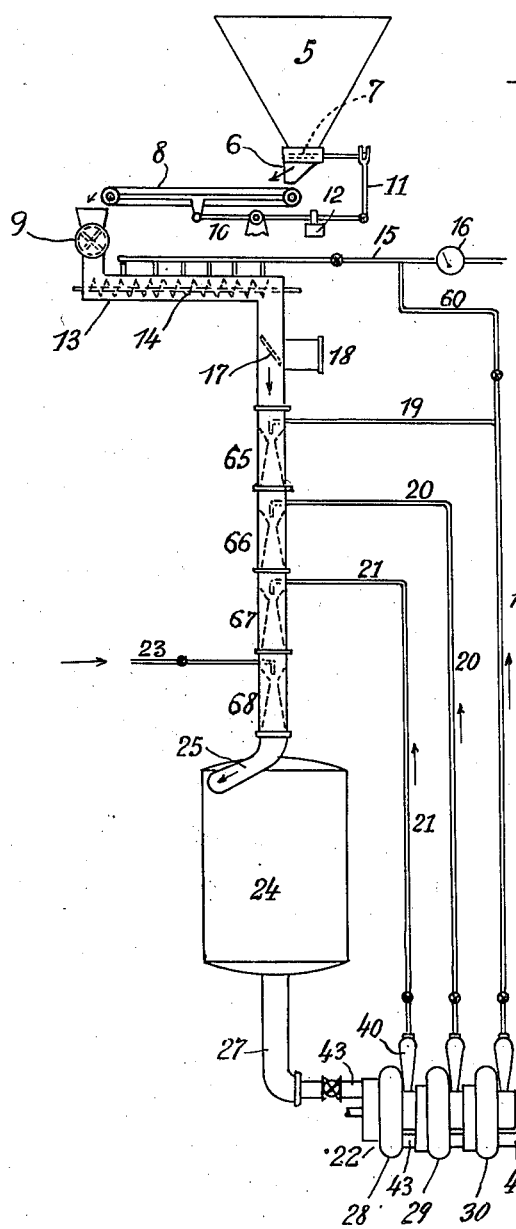

2,309,989

UNITED STATES PATENT OFFICE 2,309,989

APPARATUS FOR COOKING GRAIN MASH

Bernard E. Saltzman, Lawrenceburg, Ind.

Application July 2, 1941, Serial No. 400,806

1 Claim. (Cl. 99—278)

This invention relates to improvements in the apparatus for cooking grain mash for use in the distilling industry and for other purposes. The object of the invention is to provide a continuous cooking process and apparatus therefor in which the operations of mixing the mash, conveying the mash to the cooker and cooking it, separating the mash from the steam with which it has been cooked and utilizing the separated steam for preheating and injecting the mash into the cooker, all occur as parts of a continuous process in an apparatus designed for this purpose. The advantages of a continuous process are a better product and a saving in time and cost of operation. The invention is described in the following specification and illustrated in the accompanying drawing in which Fig. 1 is a diagrammatic illustration in outline of an apparatus for carrying out the process according to this invention.

Fig. 2 is a detailed sectional view of an improved centrifugal blow down separator used in the process, showing one stage thereof, for separating the steam from the cooked mash.

Fig. 3 illustrates a modification of a part of the apparatus shown in Figure 1.

Referring to Figure 1 the numeral 5 denotes a meal hopper which contains the meal to be cooked into a mash. The meal is fed out through a spout 6, the passage of the material being controlled by a sliding or otherwise movable gate 7. The meal drops upon an endless conveyor 8 which delivers the material to a low vacuum air lock 9. The operating means for the latter and the conveyor are not shown. The quantity of meal to be deposited upon the conveyor from the hopper may be automatically and regularly measured in that the conveyor may form one arm of a weighing mechanism 10 of which the other arm is operatively connected to the gate 7 by a lever 11. This arrangement or some other equivalent mechanism is such that a predetermined quantity of meal is delivered by the conveyor to the air lock 9. If the weight of the meal is greater than required the scale is tipped and the gate 7 closed more or less as will be understood. A weight 12 may serve as an adjusting element. The rotating air lock 9 conveys the meal to a mixing chamber 13 which contains an endless screw conveyor 14. Water is supplied to the chamber from a water supply pipe 15 provided with a water metering device 16 to measure the water in proportion to the meal. The mixing of the meal and water takes place in vacuum to avoid air pockets in the mixture. The raw mash is forwarded by the screw 14 to be dropped into a four stage heater injector 65, 66, 67, 68. During the passage from the chamber 13 to the heater injectors the mash passes through a relatively coarse screen 17 to remove lumps which may be removed at 18. The first stage heater injector 65 receives steam through a steam pipe 19, the second stage is supplied with steam through a pipe 20, the third stage receives steam through a pipe 21. The steam which is supplied to the injectors is that steam which is separated from the cooked mash in the three stage centrifugal blow down separator 22. The fourth stage injector 68 is supplied with steam from the outside at ninety pounds pressure through a pipe 23.

From the heater injectors the mash passes into the cooker 24 the entrance connection 25 being so arranged that the mash enters the cooker in a tangential direction to impart a swirling motion to the mash within the cooker whereby to obtain a more thoroughly mixed mash. From the cooker the mash passes through a pipe 27 into the three stage blow down separator 22 which consists of three units 28, 29 and 30 each of which is constructed as shown in the sectional view in Figure 2. The unit comprises a casing 32 which contains a ring of stationary turbine blades 33 which direct the incoming mash against a ring of rotating turbine blades 34 which are secured to and operated by a shaft 35. The mash is thus cooled and passes into a rotating casing 36 which is part of the rotor 34 having a plurality of radially disposed blades 37. On thus entering into a region of lower pressure the mash flashes into steam and cooler mash. The separator blades 37 fling the mash into the casing 32 through the exit openings 38 while the steam passes out through the central opening 39 to a steam strainer 40 of known design. From the strainer 40 the steam passes into the injector supply steam pipes 19, 20 and 21. From the separator 22 the mash passes into a centrifugal pump 42 through a pipe 41. The pipe inlets to the separator units are marked 43. The rotors of the separators and the pump 42 may all be driven from the same shaft 35.

From the foregoing it will be seen that the process of mixing and cooking the mash is automatic throughout and continuous. During the process the mash is conveyed through the apparatus in a steady continuous stream which insures thorough mixing and cooking due to the blow down and preheating action of the injectors, the swirling motion within the cooker and the outside steam supply at ninety pounds pressure. The preheating is gradual and the final outside steam supply provides a complete cooking of the mash in a very short time. There is no waste of steam, no waiting for mixing, charging, loading and discharge of the mash. The temperature in the cooker is the usual mash cooking temperature at 320 degrees F. which is maintained through the constant steam supply at ninety pounds pressure with a temperature of about 325 degrees F. When thereafter the mash enters the separators and the steam is separated, the mash is cooled to a temperature of about 150 degrees F. and is then ready for malting or other treatment, the separated steam passing back to the injectors.

Figure 3 illustrates a modification in which the mash is conveyed to the cooker by a four stage centrifugal pump units 50, 51, 52 and 53. There is a common drive shaft 54. The mash passes from the mixing chamber 13 through a pipe 55 to the first pump 50 and thence from pump to pump through pipes 56. The final outlet pipe 57 leads to the cooker 24. The steam supply pipes 19 to 23 deliver steam as in Figure 1.

The gradual preheating of the mash in the heater injectors is a very advantageous method of obtaining a thorough mixing of the steam and the mash and a hastening of the cooking process. The steam which is used in the injectors is a clean steam due to the gradual separation which occurs in the separator unit 22. A gradual separation is also desirable for the cooling of the mash. The separated steam may also be used to preheat the mixing water through a pipe 60, Fig. 1. The shaft 35 in the separator unit will be rotated by the impact of the incoming mash which is under pressure, and it may even be possible to utilize the rotation of this shaft for other power purposes.

I claim:

In a mash cooking apparatus, in combination, means for mixing a predetermined quantity of meal and water to form a mash, a cooking tank, a plurality of heater injectors for conveying the mash to the tank, means for supplying the latter with steam at mash cooking temperature at the point where the mash enters the tank, a plurality of cooling separators connected to the tank to receive the mash therefrom to cool the mash gradually and separate the steam therefrom, a steam pipe connected between each of said separators and each of said heater injectors to supply the latter with discharged steam from said separators at progressively increasing temperatures progressively towards the said tank and means for discharging the mash from said separators.

BERNARD E. SALTZMAN.